US008255373B2

(12) United States Patent
McKelvie et al.

(10) Patent No.: US 8,255,373 B2
(45) Date of Patent: Aug. 28, 2012

(54) ATOMIC MULTIPLE MODIFICATION OF DATA IN A DISTRIBUTED STORAGE SYSTEM

(75) Inventors: Samuel James McKelvie, Seattle, WA (US); Bradley Gene Calder, Bellevue, WA (US); Ju Wang, Redmond, WA (US); Xinran Wu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 12/258,025

(22) Filed: Oct. 24, 2008

(65) Prior Publication Data

US 2010/0114848 A1    May 6, 2010

(51) Int. Cl.
*G06F 17/00* (2006.01)
(52) U.S. Cl. ......................................................... 707/704
(58) Field of Classification Search .................... None
See application file for complete search history.

(56) References Cited

U.S. PATENT DOCUMENTS

| | | | | |
|---|---|---|---|---|
| 5,313,629 A * | 5/1994 | Abraham et al. | ............. | 707/792 |
| 5,933,834 A * | 8/1999 | Aichelen | ............................... | 1/1 |
| 5,946,685 A * | 8/1999 | Cramer et al. | ........................ | 1/1 |
| 6,173,293 B1 | 1/2001 | Thekkath | | |
| 6,240,413 B1 * | 5/2001 | Learmont | ...................... | 707/698 |
| 6,523,078 B1 * | 2/2003 | Desai | ............................. | 710/200 |
| 6,687,701 B2 * | 2/2004 | Karamanolis et al. | ................. | 1/1 |
| 6,697,846 B1 | 2/2004 | Soltis | | |
| 7,099,889 B2 * | 8/2006 | Berks et al. | ................... | 707/695 |
| 7,165,096 B2 | 1/2007 | Soltis | | |
| 7,222,119 B1 * | 5/2007 | Ghemawat et al. | ................... | 1/1 |
| 7,240,060 B2 | 7/2007 | Adya | | |
| 7,406,473 B1 | 7/2008 | Brassow | | |
| 7,650,336 B1 * | 1/2010 | Herrmann et al. | ............. | 707/704 |
| 7,680,835 B2 * | 3/2010 | MacLaurin et al. | ........... | 707/610 |
| 7,822,728 B1 * | 10/2010 | Chandler et al. | ............... | 707/704 |
| 7,987,166 B2 * | 7/2011 | Mckenney et al. | ............ | 707/704 |
| 2003/0041097 A1 | 2/2003 | Tormasov | | |
| 2004/0078658 A1 | 4/2004 | Park et al. | | |
| 2004/0133570 A1 | 7/2004 | Soltis | | |
| 2004/0133652 A1 * | 7/2004 | Miloushev et al. | ........... | 709/214 |
| 2005/0114291 A1 * | 5/2005 | Becker-Szendy et al. | ........ | 707/1 |
| 2005/0289143 A1 | 12/2005 | Oshri et al. | | |
| 2006/0004765 A1 * | 1/2006 | Anderson et al. | ............... | 707/10 |
| 2007/0276838 A1 * | 11/2007 | Abushanab et al. | ............ | 707/10 |
| 2009/0222596 A1 * | 9/2009 | Flynn et al. | ...................... | 710/22 |

OTHER PUBLICATIONS

"The Google File System," by Ghemawat et al. In: SOSP '03 Proceedings of the nineteenth ACM symposium on Operating systems principles (2003). Available at: ACM.*
PCT Notification of Transmittal of the International Search Report and the Written Opinion of the International Searching Authority, or the Declaration, 11 pages, mailed Apr. 15, 2010, regarding International Application No. PCT/US2009/060847, International Filing Date Oct. 15, 2009, Applicant's File Reference 325244-02WO.
International Search Report and Written Opinion of PCT/US2009/060847, mailed Apr. 15, 2010.

(Continued)

*Primary Examiner* — Neveen Abel Jalil
*Assistant Examiner* — Daniel Kinsaul
(74) *Attorney, Agent, or Firm* — Shook, Hardy & Bacon L.L.P.

(57) ABSTRACT

Atomic multiple modifications of streams is provided. Streams are selected for the application of an atomic multiple modification. A lock is acquired on the meta-data associated with the streams. Each stream is de-coupled from its name. Multiple modifications are applied to the selected streams. After performing the modifications, names are coupled to the streams. The lock on the meta-data associated with each stream is released.

15 Claims, 7 Drawing Sheets

OTHER PUBLICATIONS

Frangipani: A Scalable Distributed File System, http://pages.cs.wisc.edu/~remzi/Classes/838/Fall2001/Papers/frangipani-sosp97.pdf7.

DISP: Practical, Efficient, Secure and Fault-Tolerant Distributed Data Storage, http://www.eecs.harvard.edu/~ellard/pubs/ellard2004-disp.pdf.

High Performance Storage System Scalability: Architecture, Implementation and Experience, http://storageconference.org/2005/papers/13_watsonr_highperformance.pdf.

Rosebud: A Scalable Byzantine-Fault-Tolerant Storage Architecture (2004), http://citeseerx.ist.psu.edu/viewdoc/summary?doi=10.1.1.88.4.

Ghemawat et al., The Google File System, http://www.cs.cornell.edu/Courses/cs614/2004sp/papers/gfs.pdf.

Right Scale Blog, Why Amazon's Elastic Block Store Matters, http://blog.rightscale.com/2008/08/20/why-amason-ebs-matters/, Aug. 20, 2008.

Amazon EBS—Elastic Block Store has launched—All Things Distributed, http://www.allthingsdistributed.com/2008/08/amazon_ebs_elastic_block_store.html, Aug. 28, 2008.

Chang et al., Bigtable: A Distributed Storage System for Structured Data, labs.google.com/papers/bigtable-osdi06.pdf.

* cited by examiner

ATOMIC MULTIPLE MODIFICATION OF DATA IN A DISTRIBUTED STORAGE SYSTEM

BACKGROUND

Distributed systems, including server farms, web services, and distributed, network-attached storage systems have become increasingly common, providing vast amounts of computational and storage resources. Distributed storage systems use storage space across multiple nodes throughout a potentially wide-area network. Data access routines for accessing data stored on nodes in a distributed storage system must manage multiple client sessions requiring simultaneous access. However, to maintain a consistent view of the data, modification access must be limited to one host at a time. Additionally, a client session performing multiple modifications must maintain data consistency throughout the application of the multiple modifications.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Embodiments of the present invention relate to performing multiple modifications to one or more streams as a single atomic unit called an atomic multiple modification. In some embodiments, if one of the multiple modifications is not successful (e.g., if the preconditions are not met), the modifications successfully applied are reversed, returning the streams to their original state before the start of the atomic multiple modification.

BRIEF DESCRIPTION OF THE DRAWINGS

Illustrative embodiments of the present invention are described in detail below with reference to the attached drawing figures, wherein.

DETAILED DESCRIPTION

Figure 1:
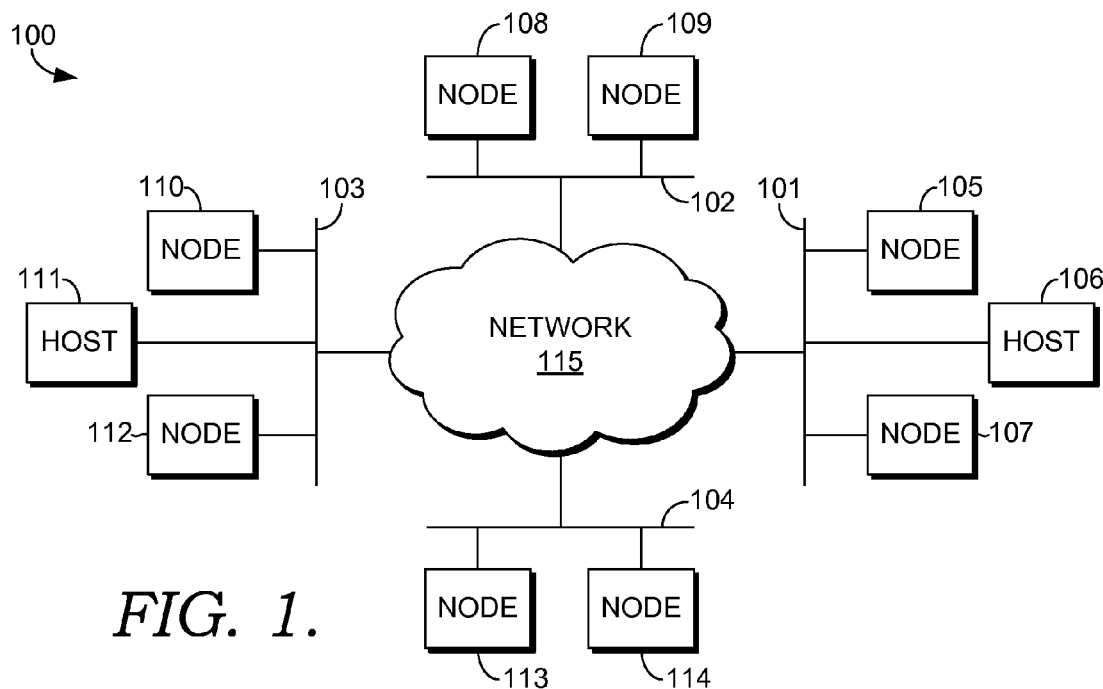
FIG. 1 depicts a diagram of an exemplary network environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to making multiple modifications of data that is stored in a distributed manner across a network of storage nodes. In a network composed of multiple nodes distributed throughout a large network, each unit of data can be accessed by a plurality of client sessions, potentially simultaneously. Furthermore, there is consistency to be maintained across different pieces of data across the network. In order for a consistent view of the data to be maintained across all client sessions accessing the data, modification of the data needs to be coordinated. Without coordination over the modification of the data, it is possible for two client sessions to modify two pieces of data in an inconsistent manner, causing unpredictable results. Furthermore, without atomic application of multiple interdependent modifications, it is possible for the failure of a modifying client session to leave data in an inconsistent state, or for a second client session to read data representing an intermediate inconsistent state.

To prevent these types of inconsistencies, primitive operations are required to coordinate the modification of data. In particular, when independent application of individual modifications would create a temporary inconsistent state, it is desirable to have the ability to apply multiple interdependent modifications to one or multiple pieces of data as an atomic transaction, thereby preventing inconsistencies in the view of the data from other client sessions in the distributed network. Furthermore, it is also desirable to be able to cancel an entire set of multiple modifications if one or more of them cannot be successfully applied, thereby preventing inconsistencies in the view of the data resulting from a partially successful transaction. Additionally, it is desirable to be able to specify one or more expected preconditions that must be met before a particular modification can be successfully applied, thereby allowing client sessions to coordinate the application of independent, potentially conflicting transactions in an "optimistic" manner, without necessitating the use of distributed locks.

By way of example, client session X and client session Y are both executing an algorithm that requires them to read the value of data A and compute new values for data A and data B which are based on the previous value of data A and other external data determined by the respective client session (data $C_x$ for client session X and data $C_y$ for client session Y). The new values of A and B can then be written as an atomic operation. However, since no lock is held between reading the value of data A and writing the new values of data A and data B, it is possible that client session X and client session Y both read data A at the same time, then independently compute new values for data A and data B. First client session X and then client session Y will attempt to write their respective new values for data A and data B using an atomic modify transaction, and both will succeed. However, the effect of the modification applied by client session X is effectively undone by the modification applied by client session Y, resulting in potential inconsistency with respect to external data. To prevent this from happening, many traditional network-based file systems would require that client sessions claim a distributed lock across the read of data A through the write of data A and data B, thereby preventing client session Y from reading the value of data A until client session X has completed updating data A and data B. However, use of a distributed lock introduces significant overhead and results in a more fragile distributed system; for example, if client session X fails to release the lock, then client session Y can be prevented from making progress indefinitely. The present invention avoids the need for explicitly distributed locks by allowing client session X and client session Y to specify preconditions that must be met when they attempt to write new values for data A and data B. In this example, client session X and client session Y each require that before data A and data B can be replaced, it must be true that the value of data A has not changed since it was read. Client session Y will succeed in its update, since no modifications occurred between reading data A and writing data A and data B. However, client session X will not succeed in updating any data, since the value of data A changed between reading data A and attempting the update. Client session X is free to abandon the operation, or to restart the entire sequence by reading data A once again. In any case, all data remains consistent both internally and with external state.

The specific data being stored in the network can be in many different forms. Common forms include files and groupings of similar files. According to some embodiments of the present invention, the data is organized into streams, wherein each stream is a data entity composed of miscellaneous stream metadata properties (e.g., a stream name, access control policy, expiration time, etc.), as well as an ordered sequence of references to extents. Each extent is composed of a contiguous ordered sequence of append blocks. Each append block is immutable and is composed of a contiguous ordered sequence of byte values. New extent references may be appended to the end of a stream, but once appended, extent references cannot be deleted from a stream. It is possible for more than one stream to contain references to the same extent, or even for a single stream to contain multiple references to the same extent. New append blocks may be appended to an extent until the extent becomes sealed, after which the extent becomes immutable. Once an extent is sealed, it cannot be unsealed. Append blocks may not be modified or removed from an extent regardless of whether or not the extent is sealed. Therefore, streams and extents only grow in size.

According to one embodiment of the invention, streams are organized in a file system by to storing extent data on a large group of independent, loosely-coupled extent servers, and storing meta-data describing each stream on a centralized server or small, tightly-coupled group of servers. To append data to an extent, the client session interacts with the correct independent extent server; consequently, appending to extents is highly scalable, but does not facilitate coordination of appends to distinct extents. In contrast, the meta-data for all related streams is maintained on a centralized server, so efficient coordination of updates to stream metadata is possible.

By way of example, the meta-data associated with each stream could include information such as the current stream name, a globally unique identifier (GUID), access control policy, expiration time, and an ordered list of references to the extents that make up the stream. One advantage of this organization is that extent references can be copied from one stream to another without the need to move any data in the network. Instead, only reference lists are altered in the meta-data stored on the centralized server. Because the duplication operations only affect stream metadata, they can be efficiently included as part of an atomic multiple modification. In other embodiments of the invention, the meta-data itself could be distributed among multiple nodes in the network. Those skilled in the art will recognize the present invention could apply to data formats other than streams.

According to some embodiments, the invention provides the ability to batch multiple stream precondition constraints and mutation operations into a list of operations and have them execute as one atomic multiple modification. Operations include: stream meta-data precondition constraints, stream creation, stream deletion, stream renaming, duplication of existing extent references from other streams, and setting of miscellaneous stream properties such as expiration time, read-only flag, access control information, and replication policy. Additionally, some embodiments of the invention provide the ability to express cross-stream operations in terms of references to other modification operations within the same multiple modification. For example, within a multiple modification, there may be additional operations applied to streams that are created by the multiple modification. Similarly, within a multiple modification, there may be additional operations applied to streams that are deleted or renamed by the multiple modification operations. By associating each individual operation record in the multiple modification with a target stream identity, and by referring to source streams in a cross-stream operation by their respective record indices in the multiple modification being performed, streams whose identities are created or whose names are changed during the multiple modification can be referenced at any time in the course of the multiple modification. For example if there are 5 records in the list of operations to be performed, then if the 3rd operation is creating a new stream, any of the other operations can refer to that stream as the stream in operation 3.

In accordance with an embodiment, the invention provides the ability to express non-modifying precondition constraints as operations in a multiple modification. These operations by themselves do not result in any change in the state of streams; however, they can cause the entire multiple modification to fail if preconditions are not met. This allows multiple clients to implement coordinated manipulation of stream state without requiring the use of external locks or other synchronization mechanisms. Examples of preconditions that may be specified include: stream existence, stream name, stream identity (a unique ID preserved across rename, but changed across delete/recreate), stream version number, stream expiration time, and extent reference count.

In accordance with a further embodiment, the invention provides the ability to effectively duplicate portions of stream content into new streams as part of an atomic multiple modification. A stream can be modeled as an ordered sequence of references to contiguous data blocks (extents) that are distributed throughout a network of storage nodes. It is possible to copy a stream by simply reading its content and writing a new stream with the same data, but in new extents. However, not only is copying large amounts of data from one extent to another an expensive network/disk-intensive activity that involves multiple network nodes but the same extent may be referenced by more than one stream. It is possible to effectively duplicate very large sections of a stream into a different stream (possibly in a different position) simply by duplicating the extent; this action is lightweight and requires no copying of actual stream data content. Furthermore, all of the state that is manipulated to perform this type of duplication can be maintained by the central meta-data server. A consequence of this model is that duplication of potentially large portions of stream content from one stream into another can be performed as part of an atomic multiple modification, without requiring locks to be held for long periods of time. Clients could use this capability for many purposes, including stream concatenation, garbage collection, log/journal truncation, single-instancing, and aliasing. Additionally, it is possible to batch a large number of unrelated operations together into an atomic multiple modification to reduce the number of transactions required to complete a certain amount of work. Since meta-data modifications are durable transactions, they must be redundantly committed to persistent storage before they can be considered complete. The latency/performance of durable storage (disk) commit operations can be a major limiting factor in the scalability/performance of a transaction system, and the ability to combine many operations into a single commit can be advantageous. Also, since the server can be able to examine all of the operations before applying any changes, optimizations can be implemented that would not be possible otherwise.

In accordance with some embodiments, the invention facilitates the ability to express "all-or-none" semantics and "simultaneous operations." All-or-none semantics guarantees that if any operation in the multiple modification fails, then the entire multiple modification fails and the state of the streams selected for modification are left in the state prior to the start of the multiple modification. This allows clients to rely on the consistency of the state as well as the atomicity of the multiple modifications. Simultaneous operations in a multiple modification system allow certain sets of modification to occur in a single atomic multiple modification that would be difficult or inefficient if the operations were performed strictly sequentially. By way of example, it is possible in the same multiple modification to rename stream "A" to "B" with one operation, and rename stream "B" to "A" in another operation (i.e., to swap two streams in the namespace with two operations). These two operations would not succeed if performed sequentially, since the first operation would fail due to a namespace collision. Performing the swap sequentially would require three operations and the introduction of a temporary stream name (i.e., rename "A" to "C", rename "B" to "A", rename "C" to "B"). It would also complicate the process of "unwinding" a partially completed multiple modification (all-or-none semantics) if one operation fails after others have succeeded. An atomic multiple modification is treated as an unordered set of operations that are all applied simultaneously, eliminating the need for the client to express intermediate consistent states, and allowing the server to optimize implementation of the atomic multiple modification.

According to further embodiments of the invention, the present invention provides the ability to implement simple client-accessible distributed locks and distributed leases using atomic multiple modifications. Stream meta-data includes an expiration time property that can be used to cause a stream to be automatically deleted after a specified interval unless the expiration time is extended. By using the expiration time in conjunction with an atomic multiple modification, a set of clients can compete for a lease or lock by attempting to create a new stream with an agreed-upon name, and can extend a lease by extending the expiration time on the stream that was successfully created. Ownership of a lease/lock may be effectively added as a precondition to any other stream meta-data atomic multiple modification by adding existence of the self-created lease stream and its continued possession of the agreed upon name as additional preconditions to the multiple modification. If a client fails while holding a lease/lock, the lease or lock file can be automatically deleted when its expiration time arrives, allowing another client to claim the lease. Because the lease or lock is represented as an ordinary stream, the tools and mechanisms available for streams (e.g., namespace organization, access control, browsing/viewing, etc.) are intrinsically available for leases and locks as well.

Accordingly, an embodiment of the invention is directed to computer-readable storage media embodying computer-executable instructions for performing a method of performing multiple modifications to one or more streams as a single atomic unit. One or more streams are selected for modification as selected streams. A lock is acquired on the one or more meta-data associated with the selected streams. The names associated with the selected streams are de-coupled from the selected streams. A a plurality of modifications is performed on the selected streams. The names associated with the selected streams are re-coupled to the selected streams. The lock associated with the meta-data associated with the one or more selected streams is released.

According to another embodiment, the invention is directed to computer-readable storage media embodying computer-executable instructions for performing a method of performing multiple modifications to one or more streams as a single atomic unit. One or more streams are selected for modification as selected streams. A lock is acquired on the meta-data associated with the selected streams. The names associated with each of the selected streams are de-coupled from the selected streams. A first modification is performed on the selected streams. It is determined that a second modification would create an inconsistency if performed. The first modification to the selected streams is reversed. The names associated with the selected streams are re-coupled to the selected streams. The lock on the meta-data associated with the selected streams is released.

According to a further embodiment, the invention is directed at computer-readable media storing computer-executable instructions for performing a method of performing multiple modifications to one or more streams as a single atomic unit. One or more append-only streams are selected for modification as selected streams. A lock is acquired on the meta-data associated with the selected streams, where acquiring the lock comprises modifying a stream with a predetermined name to be a lock stream. The name associated with each selected stream is decoupled from its associated selected stream. A first modification is applied to the selected streams. It is determined if a second modification would create an inconsistency if applied. If the modification would create an inconsistency, then the first modification to the selected streams is reversed. If the second modification would not create an inconsistency, then the second modification is applied to the selected streams. The names associated with the selected streams are re-coupled to the selected streams. The lock associated with the meta-data associated with the selected streams is released.

Having described an overview of embodiments of the present invention, an exemplary operating environment in which embodiments of the present invention may be implemented is described below in order to provide a general context for various aspects of the present invention. Referring initially to FIG. 1 in particular, a typical network topology 100 consists of a number of interconnected network segments 101, 102, 103, 104, each segment connected to a larger network 115. Network segment 101 has host 106 and two nodes 105, 107 that participate in data storage. Network segment 102 has two nodes 108, 109 that participate in data storage. Network segment 103 has host 111 and two nodes 110, 112 that participate in data storage. Finally, network segment 104 has two nodes that participate in data storage 113, 114.

By way of example, any of the nodes on the network could act as the location of meta-data describing the streams stored throughout the network, including lists of extent references in each stream, and the set of nodes holding each extent. Client sessions on host 111 and host 106 could simultaneously desire to perform an atomic multiple modification to a stream having extent instances stored on node 112 and node 109. Node 110 could be serving as the meta-data controller. In this case, both hosts 111 and 106 would simultaneously send requests to node 110 to make changes to the desired stream's meta-data and a race would occur. By stipulating appropriate precondition constraints, whichever node originated the first request to be successfully processed by node 110 will be allowed to modify meta-data associated with the stream. The second node's request would fail, requiring the second node to deal with the precondition failure by, for example, abandoning the operation or restarting from a consistent point. This is desired behavior in an optimistic concurrency model. If the first and second nodes need to coordinate more complicated activities that involve multiple distinct transactions, they can establish locks and leases including preconditions on and manipulation of dedicated lock/lease streams in their multiple modification requests, requiring a losing node to wait until the lock is released to perform its modifications.

Figure 2:
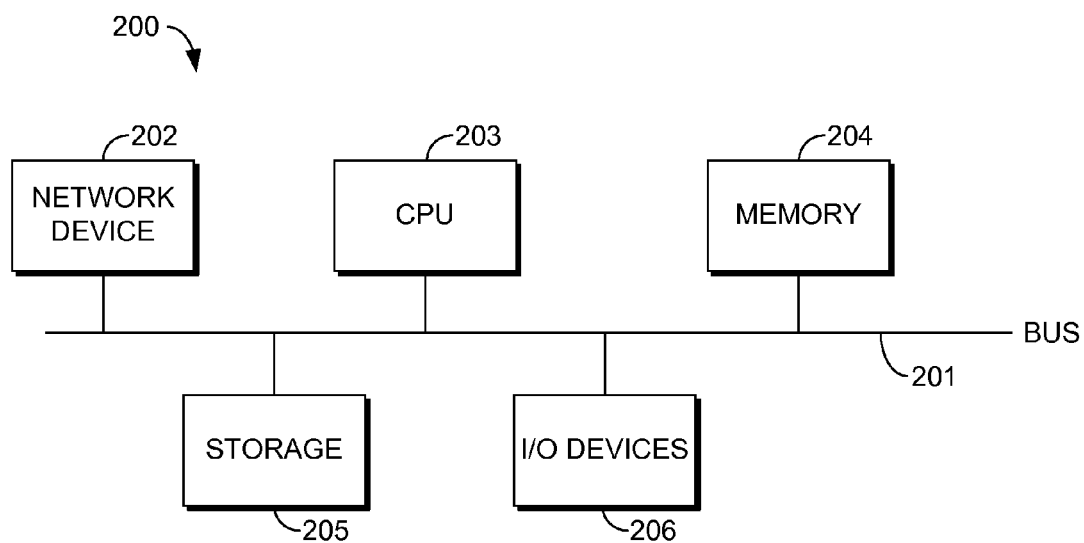
FIG. 2 depicts a block diagram of an exemplary computing device suitable for use in implementing the present invention.

Referring now to FIG. 2, an exemplary node is shown and is designated generally as a computing device 200. Computing device 200 is but one example of a suitable computing environment and is not intended to suggest any limitation as to the scope of use or functionality of the invention. Neither should the computing device 200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 2, computing device 200 includes a bus 201 that directly or indirectly couples the following devices: network device 202, CPU 203, memory 204, storage 205, and input/output (I/O) devices 206. Bus 201 represents what may be one or more buses (such as an address bus, data, bus, or combination thereof). Although the various blocks of FIG. 2 are shown with lines for the sake of clarity, in reality, delineating various components is not so clear, and metaphorically, the lines would more accurately be grey and fuzzy. For example, many processors have memory. We recognize that such is the nature of the art, and reiterate that the diagram of FIG. 2 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 2 and reference to "computing device" or "node."

Computing device 200 typically includes a variety of computer-readable media. Computer-readable media can be any available media that can be accessed by computing device 200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 200.

Memory 204 includes computer-storage media in the form of volatile memory. Exemplary hardware devices include solid-state memory, such as RAM. Storage 205 includes computer-storage media in the form of non-volatile memory. The memory may be removable, nonremovable, or a combination thereof. Exemplary hardware devices include solid-state memory, hard drives, optical-disc drives, etc. Computing device 100 includes one or more processors (CPUs) 203 that read data from various entities such as memory 204, storage 205 or I/O devices 206. I/O devices 206 allow computing device 200 to be logically coupled to other devices including input components and output components, some of which may be built in. Illustrative components include a microphone, joystick, game pad, satellite dish, scanner, printer, wireless device, etc. Computing device 200 includes a network device 202, facilitating communication with other network devices. The network device 202 acts as an additional I/O device.

Figure 3:
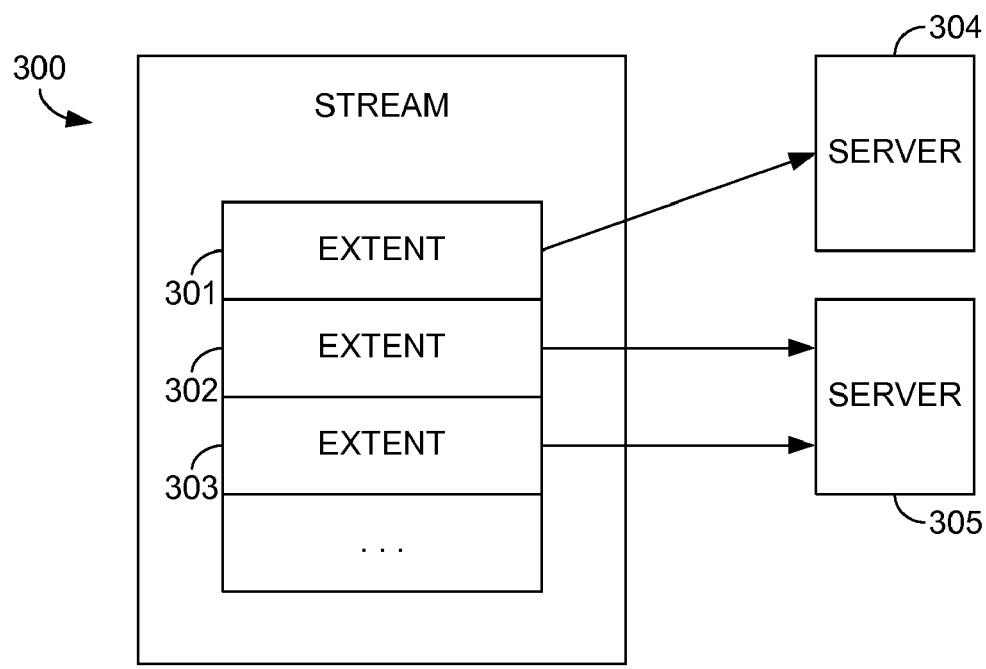
FIG. 3 presents a block diagram of an exemplary stream in accordance with an embodiment of the present invention.

Those skilled in the art will recognize that the data stored in a network of computing devices, called nodes or storage nodes, can be formatted in many ways. By way of example, it is common for independent data files, such as music files, video files, word processing documents, and the like to be stored in a distributed manner. According to an embodiment of the invention, data is modeled as a collection of streams, which may be organized into a conventional hierarchical namespace. FIG. 3 depicts a stream 300 as an exemplary data format used for data storage and on which may be made, in accordance with some embodiments of the present invention, atomic multiple modifications. A stream 300 is a collection of data that is logically associated. According to some embodiments of the invention, the stream 300 is append-only and may be very large in size, possibly exceeding by many times the individual storage capacity of the network nodes. The stream 300 is accessed by a handle, or name, and each stream, such as stream 300, has a retention and access policy. According to some embodiments of the present invention, each stream also has an associated globally unique identifier (GUID), which cannot be changed for the life of the stream (i.e., unlike the name, which can be modified, the GUID permanently identifies its associated stream). The stream 300 can be treated as a sequence of bytes, for example. The stream 300 is composed of an ordered sequence of extents 301, 302, 303. Extents 301, 302, 303 are units of allocation for streams 300. Extents 301, 302, 303 are also append-only and each extent 301, 302, 303 is identified with a globally unique identifier (GUID). Extents 301, 302, 303 can be distributed among many nodes in a network. Extents 301, 302, 303 are commonly replicated, and the replicas of the extents 301, 302, 303 can be distributed among many nodes in the network. Extents 301, 302, 303 have a size limit (e.g. 2 GB) and are a partitioning unit for many purposes. The size of an extent 301, 302, 303 is sometimes limited in order to divide the stream into chunks that may be processed in parallel for fault recovery, load balancing, replication, searching, and/or data-mining. The size of an extent may also be limited by the failure recovery modes of the storage system.

According to some embodiments of the invention, the stream 300 stores references to each extent and/or location or locations of replicas of each extent. For example, a replica of extent 301 is stored on node 304 and instances of extents 302 and 303 are both stored on node 305. It should be noted that extents can be replicated. In those scenarios, the extent data may be accessed at multiple locations, which are the locations of its replicas. The GUID of an extent will not change, but the number and the location of its replicas may change over time. For sake of clarify and simplicity, this example only illustrates the scenario where the extents are not replicated. One advantage of storing references is that it is possible to add an extent reference to a stream without copying or moving any of the data associated with the extent. By way of example, if another copy of extent 301 is to be added to stream 300, the data on node 304 does not need to be altered or copied. Instead, an additional extent reference is added to the list of extent references already in stream 300.

Figure 4:
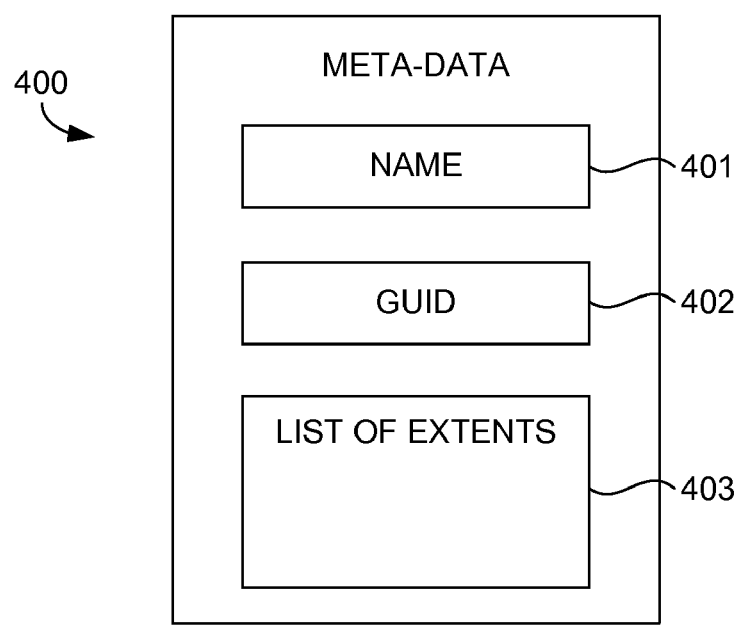
FIG. 4 presents a block diagram of an exemplary meta-data block in accordance with an embodiment of the present invention.

Streams are represented by meta-data, which can itself be distributed throughout the network, or stored on a centralized server, in accordance with an embodiment of the present invention. Referring now to FIG. 4, by way of illustration, meta-data 400 is a collection of data containing information about a stream. According to some embodiments of the invention, the meta-data 400 associated with a stream includes the name currently associated with the stream 401. Names of streams locate the stream in the directory structure used by clients accessing data. Names can change as streams are moved and modified. According to some embodiments of the invention, hosts access streams by name 401. The meta-data 400 also includes a GUID 402, which is an identifier that is globally unique and is permanently and exclusively associated with the stream (i.e., the GUID 402 for a stream never changes, and no two streams share the same GUID). The meta-data 400 associated with a stream also contains the list of extent references 403 that make up the stream. Each extent reference 403 identifies a particular extent, and allows a client or server to locate all replicas of the extent in the network, providing physical access to the actual data.

Figure 5:
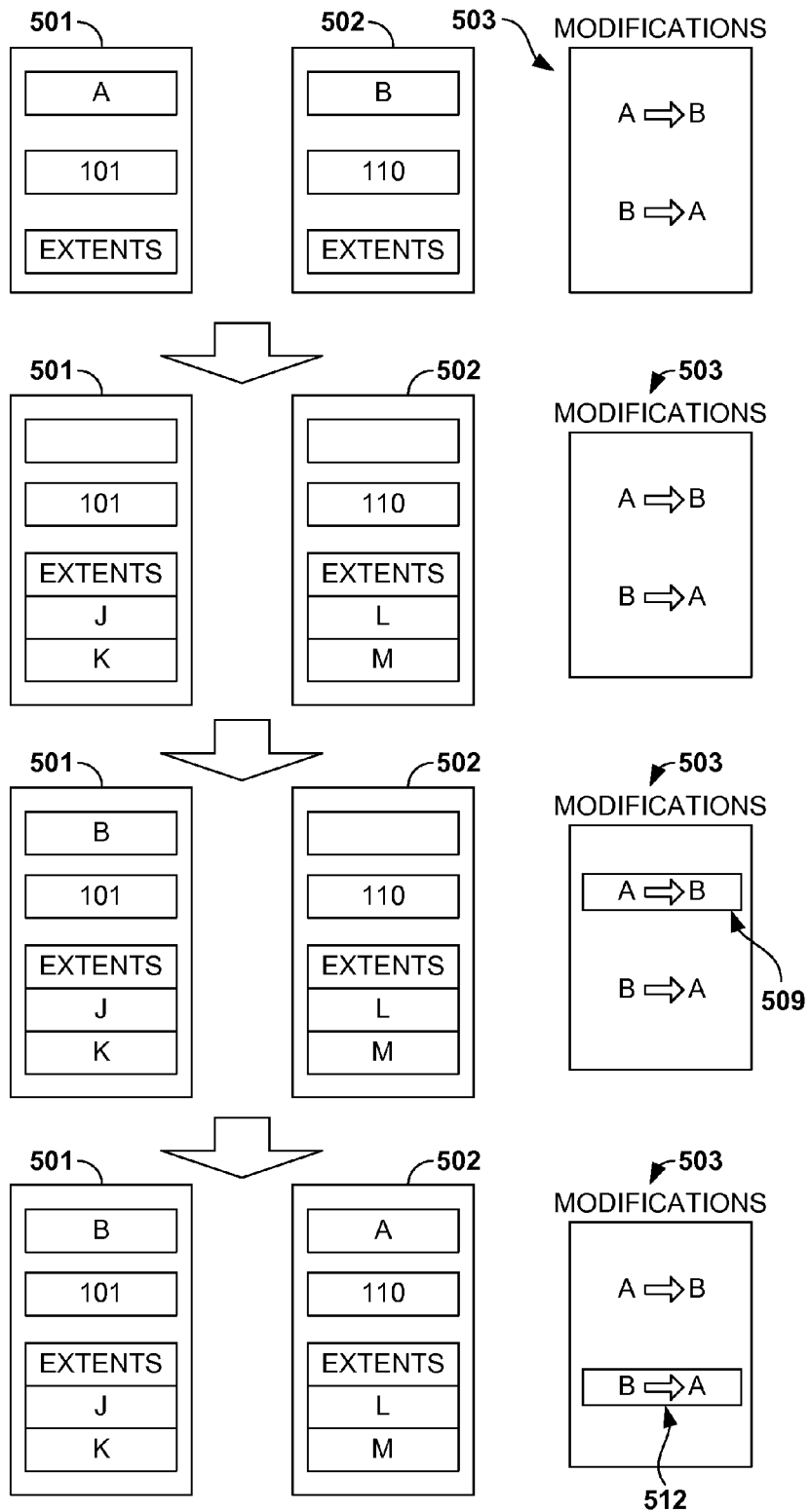
FIG. 5 presents a block diagram of an exemplary multiple modification in accordance with an embodiment of the present invention.

Atomic multiple modification involves performing multiple modifications to one or more streams. By way of example, modifications include creating a new stream, deleting a stream, renaming a stream, concatenating two or more streams, creating a copy of an existing stream, and copying a subset of the extents of a stream to a second stream. Those skilled in the art will recognize that there are many other possible modifications that could be used in combination to make up an atomic multiple modification. Turning now to FIG. 5, consider an example of an atomic multiple modification. A multiple modification set of instructions 503 consists of renaming stream 501 from "A" to "B" and renaming stream 502 from "B" to "A". It would be recognized by those skilled in the art, that using standard data copying methods would require a temporary storage area to perform such a modification, and would introduce complexity in recovering from failures, since recovery logic would need to clean up the temporary storage are in case of errors and would further need to ensure that both stream 501 and stream 502 reach a globally consistent state after recovery from failure. However, according to one embodiment of the invention, the atomic multiple modification is executed as if it is one step, thereby simplifying the recovery logic in that both stream 501 and stream 502 are in a consistent state in face of failures, and there is no temporary storage area to clean up. By way of example, the names of stream 501 and stream 502 ("A" and "B", respectively) are first removed from their meta-data, so that both streams become nameless. This de-couples the streams from the stream namespace allowing multiple modifications to occur.

A first modification 509 in the modification set 503 is performed. In this case, stream 501 is to be renamed to "B." To accomplish this, the name of stream 501 is set to "B", and stream 501 is reattached to the stream namespace. This is successful without a namespace collision, because the name "B" became available for use when stream 502 was detached from the stream namespace. A second modification 512 from the modification set 503 is also performed. In this case, stream 502 is to be renamed to "A". To accomplish this, the name of stream 502 is set to "A", and stream 502 is reattached to the stream namespace. This is successful without a namespace collision, because the name "A" became available for use when stream 501 was detached from the stream namespace.

Figure 6:
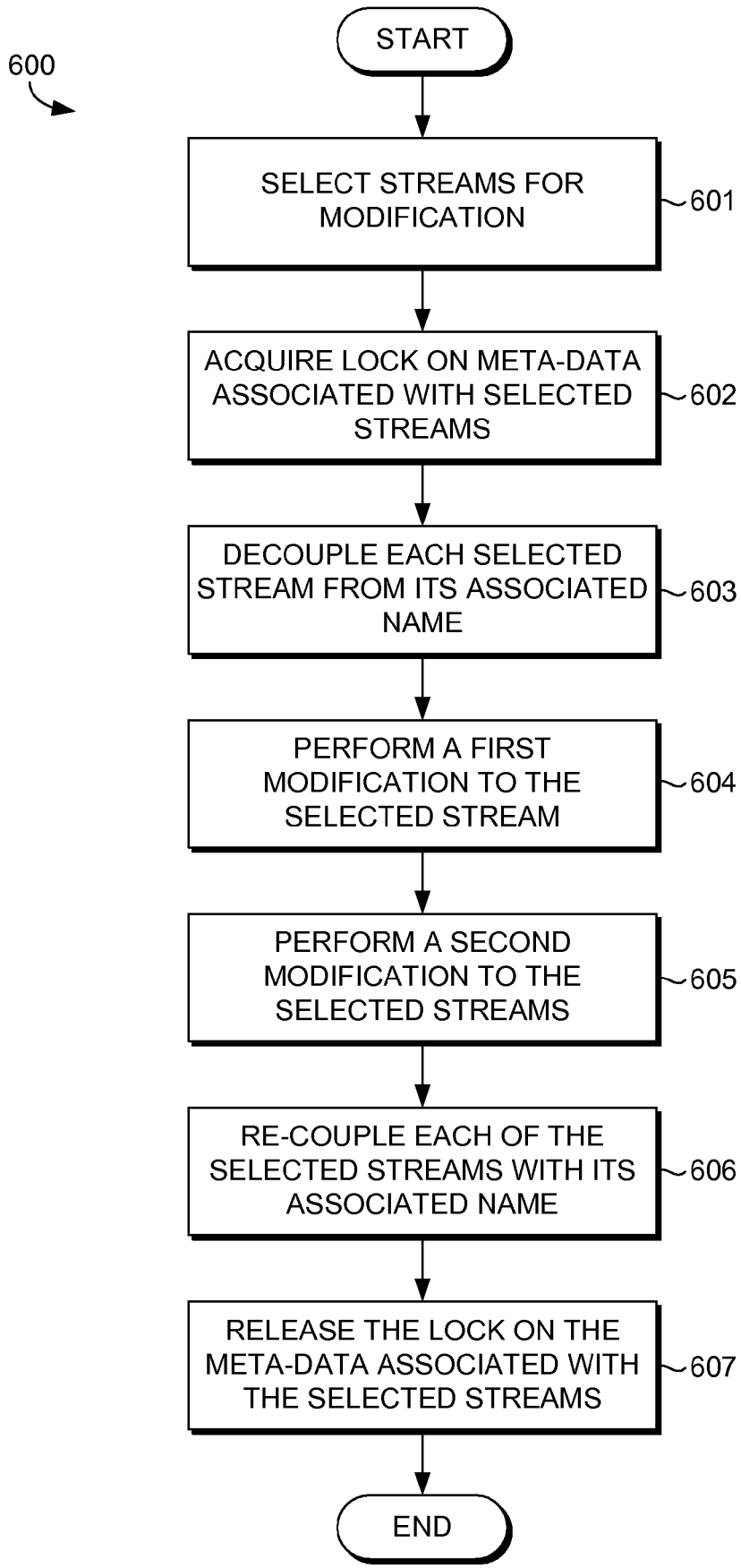
FIG. 6 illustrates a flow diagram showing a method for performing multiple modifications to one or more streams as a single atomic unit in accordance with an embodiment of the present invention.

Referring now to FIG. 6, a flow diagram is provided that illustrates a method 600 for performing an atomic multiple modification on one or more selected streams in accordance with an embodiment of the invention. One or more streams are selected for modification, as shown at block 601. Those skilled in the art will recognize that there are a number of ways in which streams could be selected for modification. By way of example, an application could provide a list of streams, each referenced by either its current name or GUID, that are to be included as streams selected for modification. The list of names and/or GUIDs is used to find the meta-data for each stream, including the list of extent references associated with the stream. According to some embodiments of the invention, the physical location of each stream is also located based on the information in the meta-data.

A lock is acquired on the meta-data associated with each of the one or more streams selected for modification, as well as the stream namespace covered by the multiple modification, as shown at block 602. Once a lock is acquired, the selected streams, which are targeted for deletion or renaming, are de-coupled from their respective names, shown at block 603. According to some embodiments of the invention, this facilitates the application of multiple modifications in a way that the modifications effect the streams as if the modifications occurred simultaneously. By way of example, the decoupling of streams from the associated names is accomplished by creating a temporary mapping storing the original coupling of stream GUIDs to names for each of the selected streams.

Multiple modifications can be made in a way that they occur as an atomic multiple modification. Although two modifications are shown in FIG. 6, one skilled in the art will recognize that any number of modifications could be combined to form a single atomic multiple modification, operating on one or more selected streams. A first modification is performed on the one or more streams, as shown at block 604, and a second modification is performed, as shown at block 605. According to some embodiments of the invention, these modifications are made such that they appear to occur simultaneously, as opposed to serially. By way of example, modifications include creating a new stream, deleting a stream, renaming a stream, updating the metadata of a stream, creating a copy of an existing stream, concatenating two or more streams, and copying a subset of the extents of a stream to a second stream.

Once all of the modifications in the atomic multiple modification are completed, the streams are re-coupled to names, as shown at block 606. According to some embodiments of the invention, the stream names are coupled to streams based on changes made to the temporary mapping by each of the modifications applied to the corresponding streams. GUIDs of the streams are used to track these changes and effect the re-coupling. The lock or locks on the meta-data associated with each of the one or more selected streams, as well as the stream namespace covered by the multiple modification is released, as shown at block 607.

Figure 7:
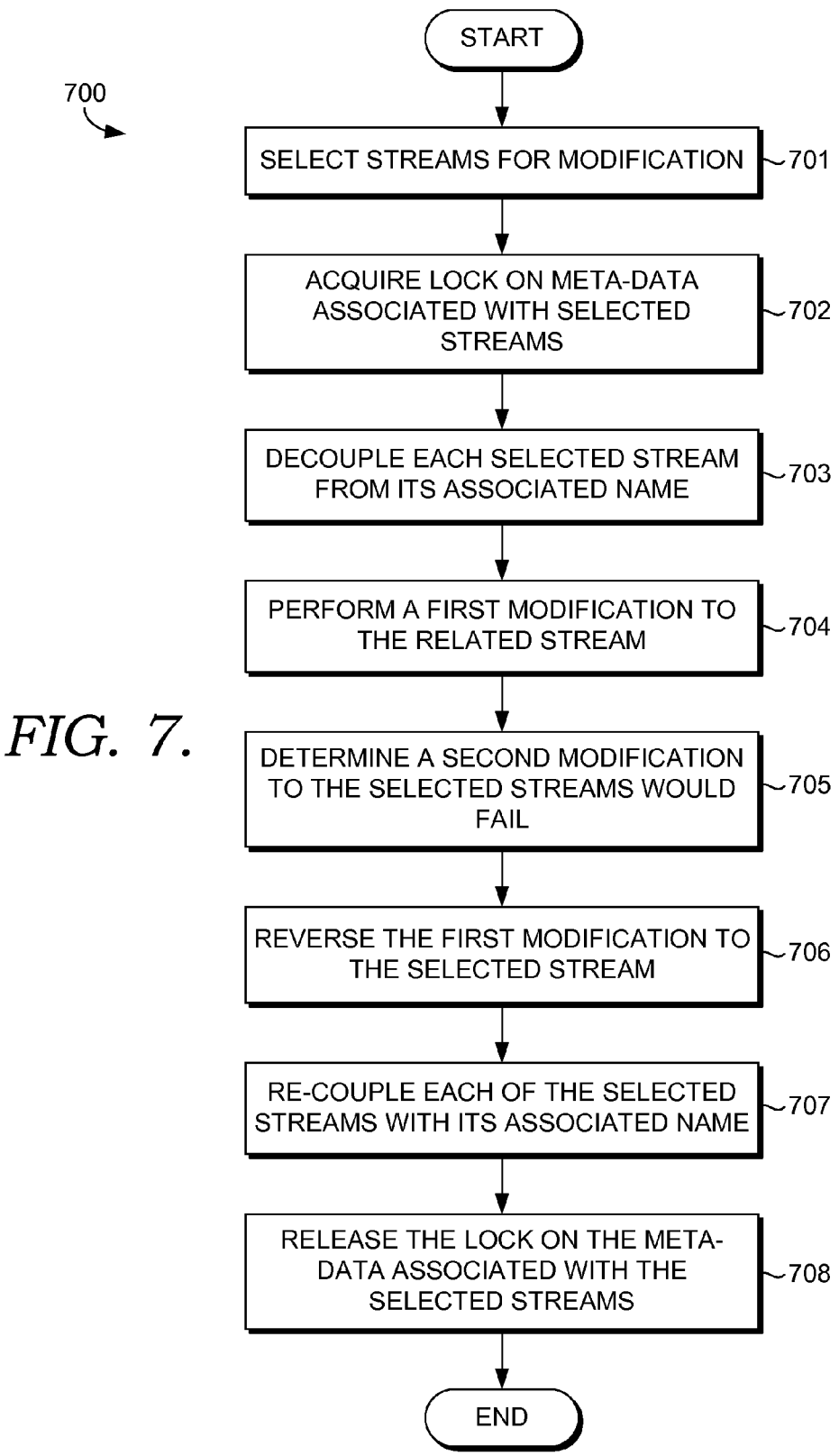
FIG. 7 illustrates a flow diagram showing a method for reversing a successful modification if it is determined that a second modification would fail in one or more selected streams in accordance with an embodiment of the present invention.

Turning now to FIG. 7, a flow diagram is provided that illustrates a method 700 for performing an atomic multiple modification on one or more selected streams, wherein a modification in the multiple modifications is unable to complete successfully, in accordance with an embodiment of the invention. It is possible that in the course of performing the modifications making up an atomic multiple modification, one of the modifications fails to complete successfully once it is performed. By way of example, two modifications in a multiple modification could both attempt to result in a stream with the same name (e.g., through stream creation or a rename). Therefore, if the multiple modification was allowed to succeed, the resulting state would depends on the order in which the modifications were performed and there is no way to perform them as if they were simultaneous. Once such a case is discovered, all the modifications performed so far as part of the atomic multiple modification are reversed and stream meta-data is reset to the state before the atomic multiple modification was begun. Similar to method 600 of FIG. 6, one or more streams are selected for the application of an atomic multiple modification, as shown at block 701, and a lock is acquired on the meta-data associated with each of the selected streams, as shown at block 702.

Each selected stream is de-coupled from its associated name, as shown at block 703 and a first modification is applied to the one or more selected streams, as shown at block 704, similar to blocks 603 and 604 of FIG. 6. A determination is made that a second modification to the selected streams would not complete successfully, as shown at block 705. One skilled in the art would recognize that there are many ways that such a determination could be made. According to some embodiments of the invention, a history of temporary reversible mutations is used to additionally provide a mechanism for unwinding any step in the process of performing an atomic multiple modification.

Once it has been determined that a failure will occur in the application of the atomic multiple modification, the modifications that have been applied are reversed, as shown at block 706. After the reversal of any modifications made to the selected streams, streams are re-coupled with their respective original names, and newly created streams are deleted, as shown at block 707. Once the modifications have been reversed, streams have been re-coupled with their original names, and newly created streams have been deleted, the lock is released, as shown at block 708, similar to block 607 in FIG. 6.

Figure 8:
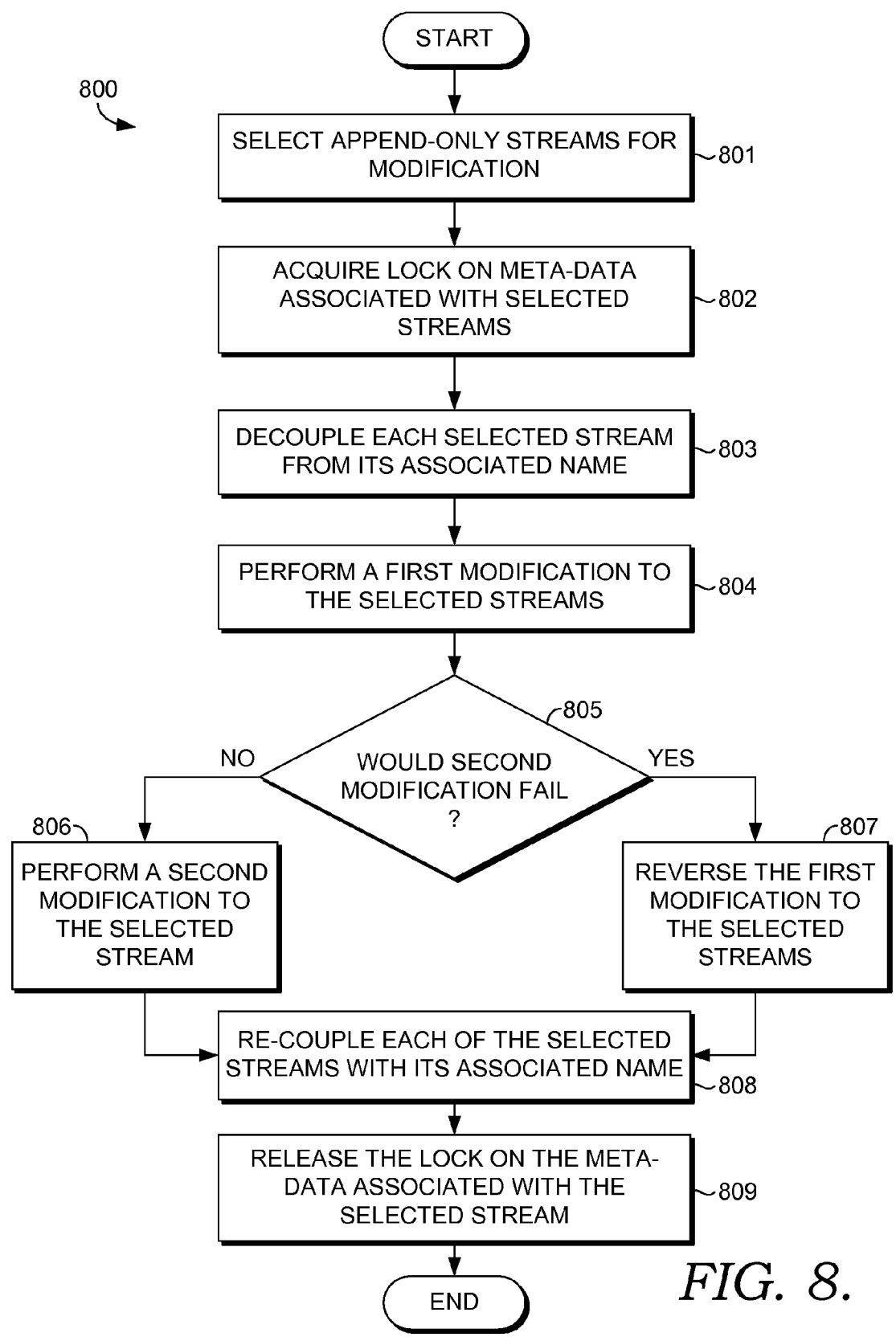
FIG. 8 illustrates a flow diagram showing a method for performing multiple modifications to one or more streams as a single atomic unit, including determining if one of the multiple modifications would cause an inconsistency or fail, in accordance with an embodiment of the present invention.

In accordance with some embodiments of the invention, a method for performing an atomic multiple modification on one or more selected streams is depicted in the flow diagram of FIG. 8. If it is detected that one of the modifications making up the atomic multiple modification would fail, the atomic multiple modification is aborted and the streams are returned to the state they were in before the start of the atomic multiple modification. One or more streams are selected for modification, shown at block 801 and a lock is acquired on the meta-data associated with the selected streams, shown at block 802, similar to blocks 601 and 602 of FIG. 6.

Each stream targeted for deletion or renaming is de-coupled from its associated name, as shown at block 803 and a first modification is performed, as shown at block 804, similar to blocks 603 and 604 of FIG. 6. It is then determined whether the application of a second modification would fail to complete successfully, as shown at block 805. This determination can be made in a manner similar to the determination of block 705 of FIG. 7. For example, if applying the second modification would associate a stream with a name that has already been associated with another stream either by the first modification, or in a previous transaction, it is determined that the second modification would not complete successfully.

If it is determined that the second modification can be performed successfully, then the second modification is performed, as shown at block 806, the streams are re-coupled to their final associated names, as shown at block 808, and the lock or locks on the meta-data associated with the streams selected for modification and the stream namespace are released, as shown at block 809. Each of these steps may be performed similarly to steps 605, 606, and 607 of FIG. 6 respectively.

If, however, it is determined that the second modification would fail, then the first modification is reversed, as shown at block 807, the streams are re-coupled to their original associated names, as shown at block 808, any newly created streams are deleted, and the lock or locks on the meta-data associated with the streams selected for modification and the stream namespace are released, as shown at block 809. Each of these steps may be performed similarly to steps 706, 707, and 708 of FIG. 7 respectively.

Figure 9:
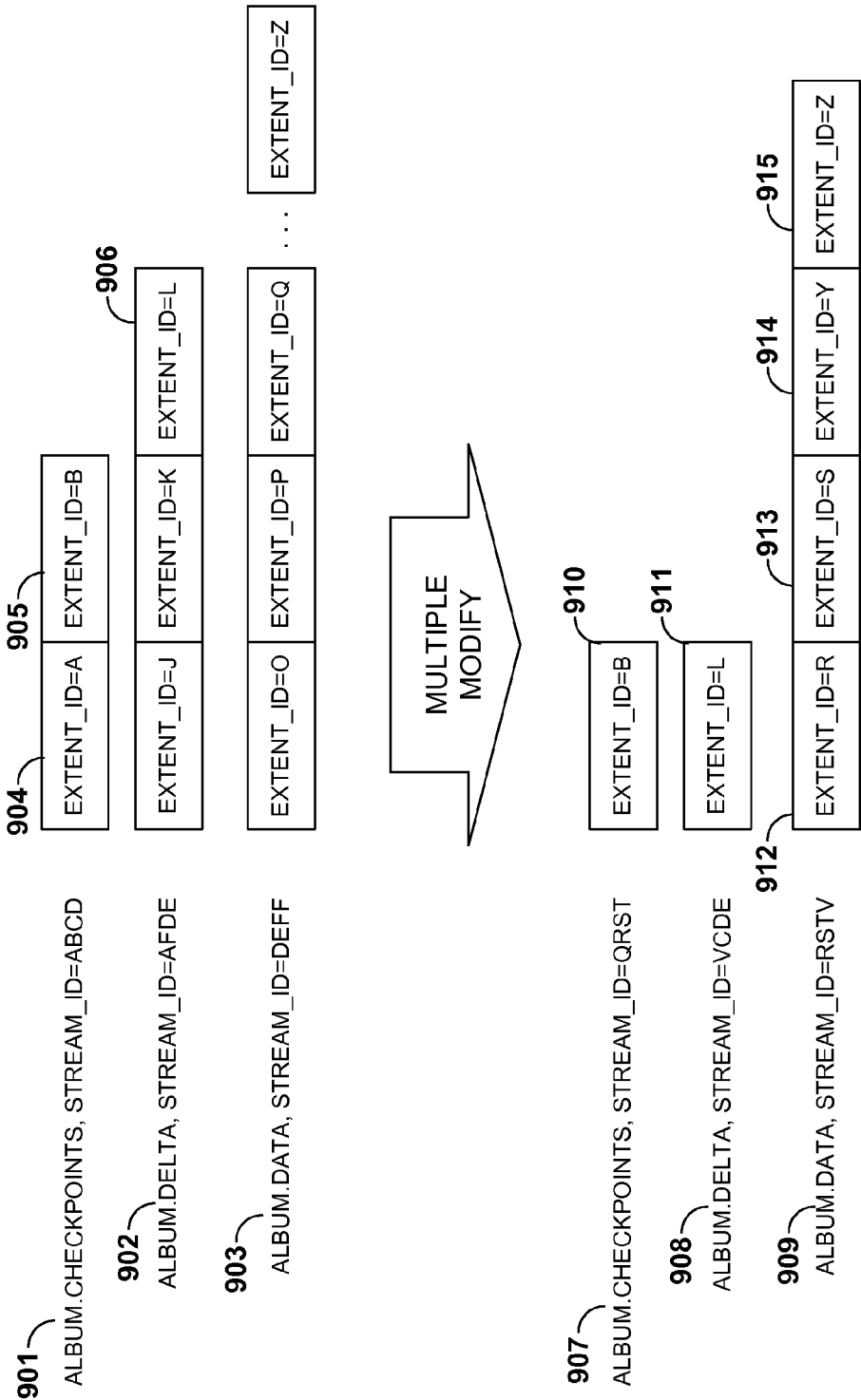
FIG. 9 illustrates an example of a multiple modification, in accordance with an embodiment of the present invention.

By way of illustration, FIG. 9 demonstrates an example of a multiple modification being carried out. The example of FIG. 9 includes an implementation of a "checkpoint+log" system of depicting state in a system. In such a system, the state of the system is represented by a snapshot containing complete state information called checkpoints and then various smaller deltas containing changes made from the last known checkpoint. A log contains a list of these deltas. To arrive at the current state of the system, a client would apply, to the last snapshot, all of the deltas in the log occurring after the last snapshot. Snapshots and deltas occurring before the most recent snapshot are old and no longer needed; therefore, a garbage collection process can periodically remove old snapshots and deltas. Those skill in the art will recognize that there are many other system applications for atomic multiple modifications.

For example, consider a system storing a photo album, where the photo album is represented with three streams: ALBUM.CHECKPOINTS 901, ALBUM.DELTA 902, and ALBUM.DATA 903. ALBUM.CHECKPOINTS 901 stores the complete list of all photos, and annotations in the album at a particular point in time. The deletion and addition of photos is stored in ALBUM.DELTA 902. The actual photos are stored in ALBUM.DATA 903. This photo album may be accessed by many thousands of clients concurrently, each adding new photos, editing and replacing photos, deleting photos, renaming photos, annotating photos, etc. Periodically, the ALBUM.DELTA 902 file may become very large and cause clients to experience long load times. Also, extents in ALBUM.DATA 903 may no longer have any references from any recent checkpoint or delta (e.g., the photos in those extents have already been deleted).

Each of the thousands of clients may have each of these streams open. The garbage collection process may eventually decide to remove unneeded items from the streams. For example, assume that ALBUM.CHECKPOINTS 901 consists of two extents, the first with an old checkpoint 904 and the second with the latest checkpoint 905. The old checkpoint could be removed, since the new checkpoint contains a complete system snapshot. ALBUM.DELTA 902 also consists of multiple extents. For this example, assume the relevant deltas from the current checkpoint 905 are all in the last extent 906, of ALBULM.DELTA. ALBUM.DATA 903 contains many extents and scattered among them are extents with no referential streams; in other words, extents that could be removed. For example, only extents with IDs R, S, Y, Z (912, 913, 914, 915) are to be kept in the ALBUM.DATA stream. To clean up the unneeded extents, the garbage collection process could perform the following modifications: remove old extents from ALBUM.CHECKPOINTS 901, remove old extents from ALBUM.DELTA 902, and remove any extents in ALBUM.DATA 903 that are not referenced in the remaining extents in ALBUM.CHECKPOINTS 901 and ALBUM.DELTA 902. The garbage collection process can use an atomic multiple modification to accomplish these modifications.

An example of an atomic multiple modification that the garage collection process could use contains the following modifications. Modification 1: create a new stream named ALBUM.CHECKPOINTS 907, delete stream with STREAM_ID ABCD 901, and append EXTENT_ID B 910 to the new stream, which is assigned ID QRST. Modification 2: create a new stream named ALBUM.DELTA 908, delete stream with STREAM_ID AFDE 902, and append EXTENT_ID L 911 to the new stream, which is assigned STREAM_ID VCDE. Modification 3: create a new stream named ALBUM.DATA 909, delete stream with STREAM_ID DEFF 903, and append EXTENT_ID R 912, EXTENT_ID S 913, EXTENT_ID Y 914, and EXTENT_ID Z 915 to the new stream, which is assigned ID RSTV. Since all modifications are performed atomically, clients never have an inconsistent view of the album. In this particular example, it is also logically correct to modify each of these streams in separate multiple-modification transactions. These streams are modified in a single multiple-modification transaction for efficiency reasons (to reduce the number of transactions). But those skilled in the art will recognize that there are scenarios where multiple streams must be modified in one atomic transaction to ensure consistency among these streams, and multiple-modification support can be used in those scenarios.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable storage media storing computer-executable instructions for performing a method of performing multiple modifications to one or more streams as a single atomic unit, the method comprising:
   selecting one or more streams for modification as one or more selected streams, wherein the one or more streams are append-only streams;
   acquiring a lock on one or more meta-data associated with the one or more selected streams, wherein the one or more meta-data includes one or more names associated with each stream;
   decoupling each of the one or more selected streams from the one or more names associated with each stream;
   performing a plurality of modifications to the one or more selected streams;
   re-coupling each of the one or more selected streams to at least one of the one or more names;
   wherein the decoupling and re-coupling is performed using a temporary mapping storing original couplings of one or more selected stream globally unique identifiers (GUIDs) to the one or more names; and
   releasing the lock on the one or more meta-data of the one or more selected streams.

2. The media of claim 1, wherein the decoupling comprises maintaining a temporary mapping storing an original coupling of each of the one or more selected streams from the name associated with each stream.

3. The media of claim 1, wherein the plurality of modifications comprises one or more of the following: creating a new stream, appending to an existing stream, creating a copy of an existing stream, deleting a stream, renaming a stream, updating the metadata of a stream, and copying a subset of the extents of a stream to a second stream.

4. The media of claim 1, wherein re-coupling each of the one or more selected streams to at least one of the one or more names comprises associating one or more GUIDs of the one or more selected streams with the one or more names.

5. The media of claim 1, wherein the plurality of modifications affect the one or more selected streams by altering one or more pointers to extents without moving the data of the one or more extents.

6. A method for performing and storing multiple modifications to one or more streams as a single atomic unit, the method comprising:
   selecting one or more streams for modification as one or more selected streams;
   acquiring a lock on one or more meta-data associated with the one or more selected streams, wherein the one or more meta-data includes one or more names associated with each stream;
   decoupling each of the one or more selected streams from a name associated with each stream;
   performing a first of a plurality of modifications to the one or more selected streams;
   determining a second of a plurality of modifications to the one or more selected streams would create an inconsistency with the first of the plurality of modifications;
   reversing the first of a plurality of modifications to the one or more selected streams;

coupling each of the one or more selected streams to at least one name associated with each stream;

wherein the decoupling and coupling is performed using a temporary mapping storing original couplings of one or more selected stream globally unique identifiers (GUIDs) to the one or more names; and releasing the lock on the one or more meta-data of the one or more selected streams.

7. The method of claim 6, wherein the one or more streams are append-only.

8. The method of claim 6, wherein the plurality of modifications effect one or more changes in the temporary mapping.

9. The method of claim 6, wherein each of the plurality of modifications create a new copy of the temporary mapping, each copy indicating a snapshot of the one or more selected streams after the application of a modification of the plurality of modifications associated with the new copy of the temporary mapping.

10. The method of claim 6, wherein the reversing the first of a plurality of modifications comprises reversing changes to each of the selected streams.

11. The method of claim 6, wherein the plurality of modifications comprises one or more of the following: creating a new stream, appending to an existing stream, creating a copy of an existing stream, deleting a stream, renaming a stream, updating the metadata of a stream, and copying a subset of the extents of a stream to a second stream.

12. The method of claim 6, wherein the plurality of modifications affect the one or more selected streams by altering one or more pointers to extents without moving the data of the one or more extents.

13. One or more computer-readable storage media storing computer-executable instructions for performing a method of performing multiple modifications to one or more streams as a single atomic unit, the method comprising:

selecting one or more append-only streams for modification as one or more selected streams, wherein the one or more streams are append-only streams;

acquiring a lock on one or more meta-data associated with the one or more selected streams, wherein acquiring the lock comprises modifying a stream with a predetermined name to be a lock stream;

decoupling each of the one or more selected streams from one or more names associated with each stream;

performing a first of a plurality of modifications to the one or more selected streams;

determining if a second of a plurality of modifications to the one or more selected streams would create an inconsistency with the first of the plurality of modifications;

if the second of a plurality of modifications would create an inconsistency, reversing the first of a plurality of modifications to the one or more selected streams;

if the second of a plurality of modifications would not create an inconsistency, performing a second of a plurality of modifications to the one or more selected streams;

coupling each of the one or more selected streams to at least one name associated with each stream;

wherein the decoupling and coupling is performed using a temporary mapping storing original couplings of one or more selected stream globally unique identifiers (GUIDs) to the one or more names; and releasing the lock on the one or more meta-data of the one or more selected streams.

14. The media of claim 13, wherein the plurality of modifications affect the one or more selected streams by altering one or more pointers to extents without moving the data of the one or more extents.

15. The media of claim 13, wherein the plurality of modifications comprises one or more of the following: creating a new stream, appending to an existing stream, creating a copy of an existing stream, deleting a stream, renaming a stream, updating the metadata of a stream, and copying a subset of the extents of a stream to a second stream.

* * * * *